US011171863B2

(12) United States Patent
Carvajal Rojas et al.

(10) Patent No.: US 11,171,863 B2
(45) Date of Patent: Nov. 9, 2021

(54) SYSTEM AND METHOD FOR LAG PERFORMANCE IMPROVEMENTS (71) Applicant: Hewlett Packard Enterprise Development LP, Houston, TX (US)

(72) Inventors: Alonso Jose Carvajal Rojas, San Francisco (CR); Claudio Enrique Viquez Calderon, San Jose (CR)

(73) Assignee: Hewlett Packard Enterprise Development LP, Houston, TX (US)

(*) Notice: Subject to any disclaimer, the term of this patent is extended or adjusted under 35 U.S.C. 154(b) by 199 days.

(21) Appl. No.: 16/538,613

(22) Filed: Aug. 12, 2019

(65) Prior Publication Data
US 2021/0051093 A1 Feb. 18, 2021

(51) Int. Cl.
*H04L 12/891* (2013.01)
*H04L 12/803* (2013.01)
*H04L 12/701* (2013.01)
*H04L 12/709* (2013.01)
*H04L 12/707* (2013.01)

(52) U.S. Cl.
CPC ............ *H04L 45/245* (2013.01); *H04L 45/22* (2013.01); *H04L 47/125* (2013.01)

(58) Field of Classification Search
None
See application file for complete search history.

(56) References Cited

U.S. PATENT DOCUMENTS 8,243,729 B2  8/2012  Subramanian et al.
9,036,629 B2  5/2015  York
2009/0296710 A1*  12/2009  Agrawal .................. H04L 45/48 370/392
2010/0293200 A1*  11/2010  Assarpour ............... H04L 45/28 707/802
2014/0119193 A1*  5/2014  Anand ..................... H04L 45/28 370/237
2019/0044848 A1*  2/2019  Shivaram ................ H04L 41/12

FOREIGN PATENT DOCUMENTS

WO   WO-2018220426 A1   12/2018

OTHER PUBLICATIONS

Configuration Guide—Ethernet Switching, pp. 1-3, Retrieved from the Internet on Jun. 19, 2019 from URL: <support.huawei.com/enterprise/en/doc/EDOC1100004194/566098a4/preferential-forwarding-of-local-traffic-on-an-eth-trunk-in-a-stack>.

(Continued)

*Primary Examiner* — Scott M Sciacca
(74) *Attorney, Agent, or Firm* — Park, Vaughan, Fleming & Dowler LLP (57) ABSTRACT

One embodiment can provide for forwarding a packet. During operation, the system can identify a plurality of physical links for forwarding the packet received at a first physical port. In response to determining that one or more physical links within the identified plurality of physical links are coupled to a same line card where the first physical port resides, the system chooses one of the determined physical links coupled to the same line card for forwarding the packet. In response to determining that no physical link within the plurality of physical links is coupled to the same line card, the system chooses one physical link within the plurality of physical links for forwarding the packet.

18 Claims, 8 Drawing Sheets

(56) References Cited

OTHER PUBLICATIONS

Enterprise High Availability Design and Architectures, 2001, Retrieved from the Internet on Jun. 19, 2019 from URL: <ciscolive.com/c/dam/r/ciscolive/us/docs/2015/pdf/TECCRS-2001.pdf>.

High Availability in Layer 3 Networks Using VRRP and MAC Address, Jun. 3, 2019, pp. 1-252, Retrieved from the Internet on Jun. 26, 2019 from URL: <juniper.net/documentation/en_US/junos/topics/topic-map/mc-lag-high-availability-l3-vrrp-macsync.html>.

Virtual Switching Extension (VSX), pp. 1-47, Retrieved from the Internet on Jun. 19, 2019 from URL: <community.arubanetworks.com/aruba/attachments/aruba/unified-wired-wireless-access/91613/4/Airheads_VSX_clean.pdf>.

* cited by examiner

```
//This function determines which LEG (LEG1 or LEG2) is closer to the line card LC
//They could be equally distant in which case "Equal" is returned Closer (LEG1, LEG2, LC {

If (LEG1.line_card == LEG2.line_card == LC.number)
        return "EQUAL"
    If (LEG1.line_card == LC.number)
        return "LEG1"
    If (LEG2.line_card == LC.number)
        return "LEG2"

If (LEG1.chassis == LEG2.chassis == LC.chassis)
        return "EQUAL"
    If (LEG1.chassis == LC.chassis)
        return "LEG1"
    If (LEG2.chassis == LC.chassis)
        return "LEG2"

return "EQUAL"

SYSTEM AND METHOD FOR LAG PERFORMANCE IMPROVEMENTS

BACKGROUND

This disclosure is generally related to computer networking. More specifically, this disclosure is related to improving the performance of a link aggregation group (LAG).

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Virtual Switching Framework (VSF) technology uses front-plane stacking (FPS) to virtualize multiple physical devices (e.g., switches) in the same layer into one virtual fabric, which provides high availability and scalability. For example, multiple switching devices can be connected to each other and can operate in a stacking mode to behave like a single switch.

Link aggregation allows multiple network connections (e.g., physical links) to be combined in parallel to increase the throughput. In VSF, link aggregation can be used to aggregate physical links (referred to as LAG legs) between a VSF fabric and its upstream and downstream devices across the VSF members. In situations where the VSF members are located within different switch chassis, a link aggregation group (LAG) may include physical ports from different chassis. Conventional load balancing in a LAG may unnecessarily route traffic through inter-chassis links, which can lead to increased latency and congestion.

Embodiments described herein solve the technical problem of performing LAG load balancing in a Virtual Switching Framework (VSF) environment. When performing load balancing over a LAG, a controller can take into consideration physical locations (e.g., locations of the line cards and chassis) of the physical ports to which the LAG legs are coupled. More specifically, the controller identifies LAG legs that are local (e.g., the corresponding physical ports are on the same line card or on the same chassis) to the incoming port of the traffic, and balances the traffic among the local LAG legs. If no local LAG leg exists, the controller balances traffic among all LAG legs. In addition to LAG load balancing in the VSF environment, this technology can also be used to balance load in an equal-cost multi-path (ECMP)-enabled network.

One embodiment can provide a method and system for forwarding a packet. During operation, the system can identify a plurality of physical links for forwarding the packet received at a first physical port. In response to determining that one or more physical links within the identified plurality of physical links are coupled to a same line card where the first physical port resides, the system chooses one of the determined physical links coupled to the same line card for forwarding the packet. In response to determining that no physical link within the plurality of physical links is coupled to the same line card, the system chooses one physical link within the plurality of physical links for forwarding the packet.

In a variation on this embodiment, in response to determining that one or more physical links within the identified plurality of physical links are coupled to a same switch chassis where the first physical port resides, the system chooses one of the determined physical links coupled to the same switch chassis for forwarding the packet.

In a variation on this embodiment, the identified plurality of physical links are coupled to different switch chassis.

In a further variation, the identified plurality of physical links are coupled to a switch fabric comprising multiple switch chassis implementing a front-plane stacking technology.

In a variation on this embodiment, choosing one of the determined physical links coupled to the same line card or same switch chassis for forwarding the packet can include performing a load-balancing operation.

In a further variation, performing the load-balancing operation comprises comparing bandwidths of the determined physical links.

One embodiment can provide a method and system for creating a load-balancing table on a line card. During application, a controller of the line card can identify a plurality of physical links for forwarding traffic arrived at the line card. In response to determining that one or more physical links within the identified plurality of physical links are coupled to the line card, the controller can add the one or more physical links coupled to the line card to the load-balancing table. In response to determining that no physical link within the identified plurality of physical links is coupled to the line card and that one or more physical links within the identified plurality of physical links are coupled to a same switch chassis where the line card resides, the controller can add the one or more physical links coupled to the same switch chassis to the load-balancing table.

In a variation on this embodiment, in response to determining that no physical link within the identified plurality of physical links is coupled to the same switch chassis where the line card resides, the controller can add all physical links within the identified plurality of physical links to the load-balancing table.

In a variation on this embodiment, adding the one or more physical links coupled to the line card or the same switch chassis to the load-balancing table can further include: comparing bandwidths associated with the one or more physical links, and adding physical links with a higher bandwidth to the load-balancing table.

In a variation on this embodiment, the identified plurality of physical links are coupled to different switch chassis, and the different switch chassis can implement a front-plane stacking technology to form a single logical switch.

In a variation on this embodiment, in response to detecting that a new physical link is added to the identified plurality of physical links, the controller can update the load-balancing table based on a distance between the new physical link and the line card.

In a further variation, updating the load-balancing table can include: for each physical link in the load-balancing table, if a distance between the physical link and the line card is greater than a distance between the new physical link and the line card, removing the physical link from the load-balancing table and adding the new physical link to the load-balancing table; if a distance between the physical link and the line card equals a distance between the new physical link and the line card, adding the new physical link to the load-balancing table; and if a distance between the physical link and the line card is less than a distance between the new physical link and the line card, leaving the load-balancing table unchanged.

In a variation on this embodiment, the load-balancing table can be stored in an application-specific integrated circuit (ASIC) residing on the line card.

One embodiment can include a switch controller. The switch controller can include a processor and a storage device coupled to the processor and storing instructions, which when executed by the processor cause the processor to perform a method. The method can include identifying a plurality of physical links for forwarding a packet received at a first physical port; in response to determining that one or more physical links within the identified plurality of physical links are coupled to a same line card where the first physical port resides, choosing one of the determined physical links coupled to the same line card for forwarding the packet; and in response to determining that no physical link within the plurality of physical links is coupled to the same line card, choosing one of the plurality of physical links for forwarding the packet.

Link Aggregation in VSF

Figure 1:
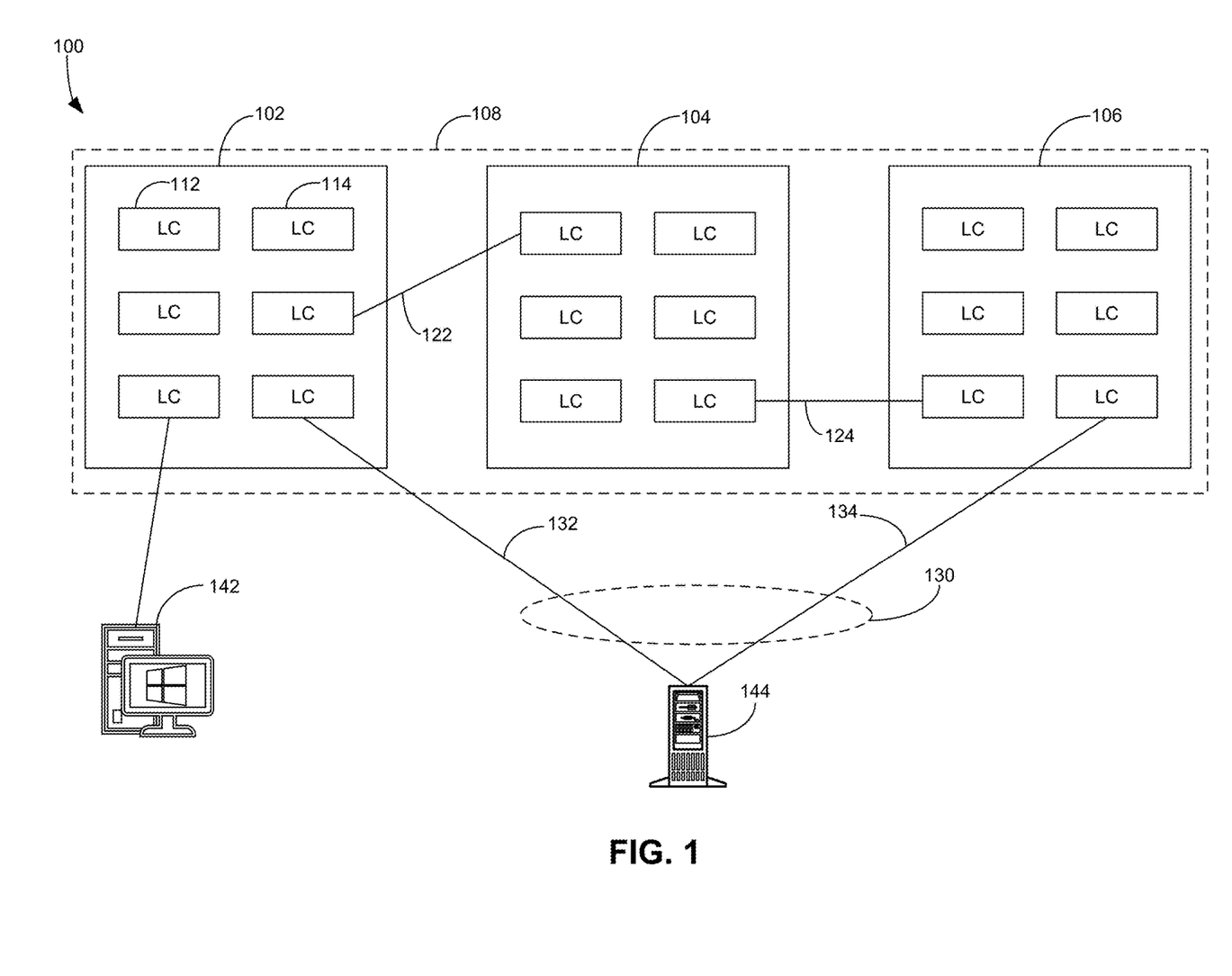
FIG. 1 illustrates an exemplary Virtual Switching Framework (VSF) environment, according to one embodiment.

FIG. 1 illustrates an exemplary Virtual Switching Framework (VSF) environment, according to one embodiment. VSF environment 100 can include a number of switch chassis (e.g., switch chassis 102, 104, and 106). Each chassis can include a number of line cards. For example, chassis 102 can include line cards (LCs) 112 and 114. Although not shown in the drawing, each line card can include multiple switch ports. In some embodiments, the switch ports can include 1 Gbps ports and 10 Gbps ports. Switch ports of other different speeds are also possible.

VSF implements the front-plane stacking (FPS) technology to allow switches from different switch chassis to interconnect to form a large logical switch. For example, switches within switch chassis 102 can be coupled to switches within switch chassis 104 using, for example, standard Ethernet connections, which can be based on copper coaxial cables or optical fibers. Similarly, switches within switch chassis 106 can also be coupled to switches within switch chassis 104. An inter-chassis link can be referred to as an FPS link. For example, in FIG. 1, FPS link 122 connects switch chassis 102 and 104, and FPS link 124 connects switch chassis 104 and 106. In FIG. 1, interconnected switch chassis 102, 104, and 106 form a large logical switch 108.

As discussed previously, link aggregation can be used to create a logical link from multiple physical links. Each physical link within a link aggregation group (LAG) can be referred to as a LAG leg. Load balancing can be performed among all physical links or legs within a LAG prior to forwarding traffic over the LAG. More specifically, a load-balancing algorithm can be used to determine which physical link or leg will be used to forward the traffic.

In VSF environment 100, a LAG can include physical links that are coupled to different switch chassis. In the example shown in FIG. 1, LAG 130 can include physical links 132 and 134. Physical link 132 is coupled to a switch port on switch chassis 102, whereas physical link 134 is coupled to a switch port on switch chassis 106.

When a client machine 142 attempts to communicate with a server machine 144 via logical switch 108, logical switch 108 can determine that LAG 130 can be used to forward packets to server 144. Because LAG 130 includes multiple physical links (e.g., physical links 132 and 134), logical switch 108 needs to select a physical link to forward the packets. More particularly, logical switch 108 may use a load-balancing technique to determine which physical link among all physical links in LAG 130 should be selected to forward the packets. In conventional approaches, when balancing the load across a LAG, logical switch 108 balances the load among all physical links without considering the physical locations of the switch ports associated with those physical links. As a result, traffic may sometimes be forwarded over a remote physical link, even when a local physical link is available.

The concepts of "local" and "remote" are used here with respect to the switch port receiving the packets. More specifically, a physical link is considered local if a switch port corresponding to the physical link and the switch port receiving the packets are located on the same switch chassis. On the other hand, a physical link is considered remote if a switch port corresponding to the physical link and the switch port receiving the packets are located on different switch chassis. In the example shown in FIG. 1, traffic from client device 142 arrives at switch chassis 102. Consequently, to such traffic, physical link 132 (which is coupled to chassis 102) is considered a local link, whereas physical link 134 (which is coupled to chassis 106) is considered a remote link.

In conventional approaches, traffic from client machine 142 to server machine 144 may be routed through remote physical link 134 as the result of load balancing over LAG 130. This arrangement will require that the packets travel over FPS links 122 and 124 before they can be sent to server machine 144 via physical link 134. Compared to sending packets directly to server machine 144 via local physical link 132, sending packets over remote physical link 134 can result in increased latency as well as possible performance degradation. Note that, because the FPS links are used to enable stacking among switches, additional data traffic over the FPS links may lead to unwanted congestion or other problems.

To avoid problems caused by the unnecessary use of remote physical links, in some embodiments, when performing load balancing over the LAG, the logical switch can consider the physical locations of the LAG legs. For example, the logical switch can give preference to local physical links over remote physical links. In some embodiments, the logical switch may exclude remote physical links during load balancing. More specifically, whenever there are one or more local LAG legs, the logical switch will always balance the traffic over the local LAG legs. The logical switch would only forward traffic over a remote LAG leg if there were no local LAG leg. In the example shown in FIG. 1, when balancing the load over LAG 130, traffic arrived at switch chassis 102 will be forwarded over local physical link 132, unless local physical link 132 becomes unavailable due to link failure.

In some embodiments, the switch application-specific integrated circuit (ASIC) stores load-balancing tables for each LAG. During operation, upon receiving a packet to be forwarded over a LAG, the system determines whether the LAG includes remote physical links. If so, the system configures the load-balancing table stored in the ASIC in such a way that local physical links are given preference over remote physical links. For example, all load-balancing tables on switch chassis 102 can be configured in such a way that any traffic that is received by switch chassis 102 and to be forwarded over LAG 130 will be forwarded over physical link 132, which is a local physical link with respect to switch chassis 102. Similarly, all load-balancing tables on switch chassis 106 can be configured in such a way that any traffic that is received by switch chassis 106 and to be forwarded over LAG 130 will be forwarded over physical link 134, which is a local physical link with respect to switch chassis 106. On the other hand, all load-balancing tables on switch chassis 104 can be configured in such a way that any traffic that is received on switch chassis 104 and to be forwarded over LAG 130 will be forwarded over physical link 132 or 134, because LAG 130 does not include a physical link that is local to switch chassis 104. In other words, when a local physical link is not available, the switch performs load balancing in a way similar to the conventional approach. The configuration of the load-balancing table is especially true for unicast traffic. For multicast traffic, the ASICs of all switches are in sync to avoid duplicated packets.

When balancing traffic among local physical links, the system may also consider to which line card a local physical link is coupled, and grant preference to a local physical link that is coupled to the same line card where the switch port receiving traffic resides.

Figure 2:
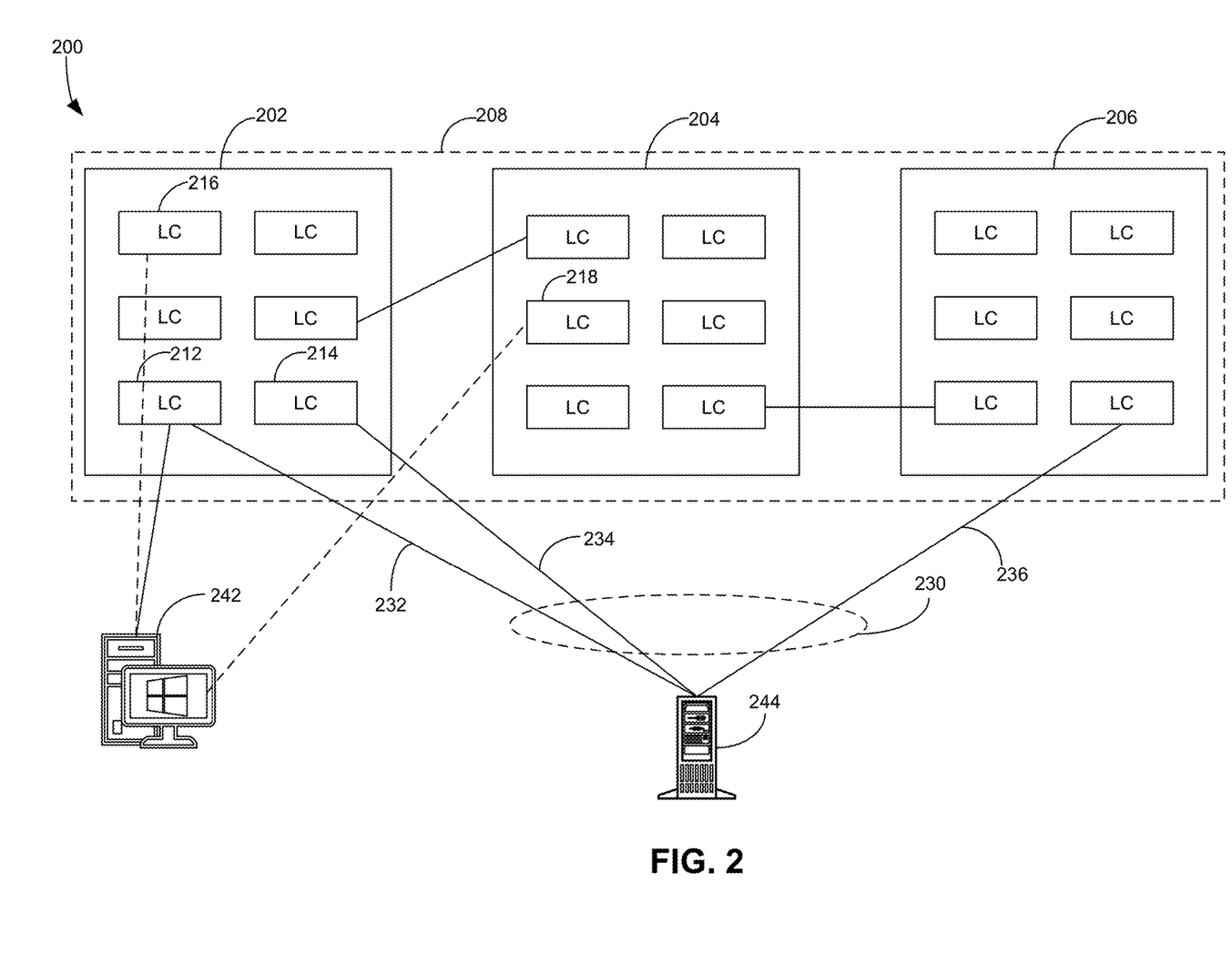
FIG. 2 illustrates an exemplary Virtual Switching Framework (VSF) environment, according to one embodiment.

FIG. 2 illustrates an exemplary Virtual Switching Framework (VSF) environment, according to one embodiment. VSF environment 200 can include a number of switch chassis (e.g., switch chassis 202, 204, and 206) interconnected to form a large logical switch 208. Each switch chassis can include a number of line cards. For example, switch chassis 202 include line cards 212, 214, and 216.

In FIG. 2, a client machine 242 attempts to communicate with a server 244 via a LAG 230, which can include three physical links (e.g., physical links 232, 234, and 236). Because packets from client machine 242 arrive at line card 212 within switch chassis 202, and because physical links 232 and 234 are also coupled to switch chassis 202, physical links 232 and 234 are considered local physical links to the incoming traffic. On the other hand, physical link 236 is coupled to a different switch chassis (i.e., switch chassis 206) and is considered a remote physical link to the incoming traffic.

As discussed previously, when performing load balancing over LAG 230, logical switch 208 identifies local physical links 232 and 234 and grants preference to these two local physical links over remote physical link 236. In some embodiments, the system further differentiates among the local physical links based on the line cards to which they are coupled. In the example shown in FIG. 2, traffic from client machine 242 is received by a switch port on line card 212 within switch chassis 202. Physical link 232 is also coupled to a switch port on line card 212, whereas physical link 234 is coupled to a switch port on a different line card (i.e., line card 214). Therefore, with respect to line card 212, physical link 232 can be considered local, whereas physical link 234 can be considered remote. In some embodiments, when performing load balancing between physical links 232 and 234 for traffic arrived at line card 212, logical switch 208 grants preference to physical link 232, which is local with respect to line card 212. In other words, logical switch 208 selects physical link 232 to forward traffic arrived at line card 212 and destined to server 244.

If there is no physical link that is local with respect to the line card receiving the traffic, the load can be balanced among physical links that are local with respect to the switch chassis. For example, if traffic destined to server 244 is received by a switch port on line card 216 within switch chassis 202, logical switch 208 may determine that LAG 230 does not include a physical link that is local with respect to line card 216. However, logical switch 208 can still determine that physical links 232 and 234 are local physical links with respect to switch chassis 202, and prefer physical links 232 and 234 over physical link 236, which is considered remote with respect to switch chassis 202. As a result, logical switch 208 can balance load between physical links 232 and 234. More specifically, logical switch 208 can select one of physical links 232 and 234 to forward the traffic destined to server 244. If physical link 232 is selected, traffic arriving at line card 216 is first sent to line card 212 before being forwarded to server 244 over physical link 232.

On the other hand, if the traffic destined to server 244 is received on a line card 218 within switch chassis 204, logical switch 208 first determines that the traffic needs to be routed to server 244 via LAG 230, which includes physical links 232, 234, and 236. Logical switch 208 can determine that LAG 230 does not include a physical link that is local with respect to line card 218, and can further determine that LAG 230 does not include a physical link that is local with respect to switch chassis 204. In other words, all physical links within LAG 230 are considered remote to the incoming traffic. As a result, logical switch 208 can perform load balancing over all physical links within LAG 230, meaning that logical switch 208 can select any one of physical links 232, 234, and 236 to forward the traffic.

In the example shown in FIG. 2, if traffic destined to server 244 arrives at switch chassis 206, logical switch 208 would determine that physical link 236 is a local physical link with respect to switch chassis 206 and balance the traffic over physical link 236.

Figure 3:
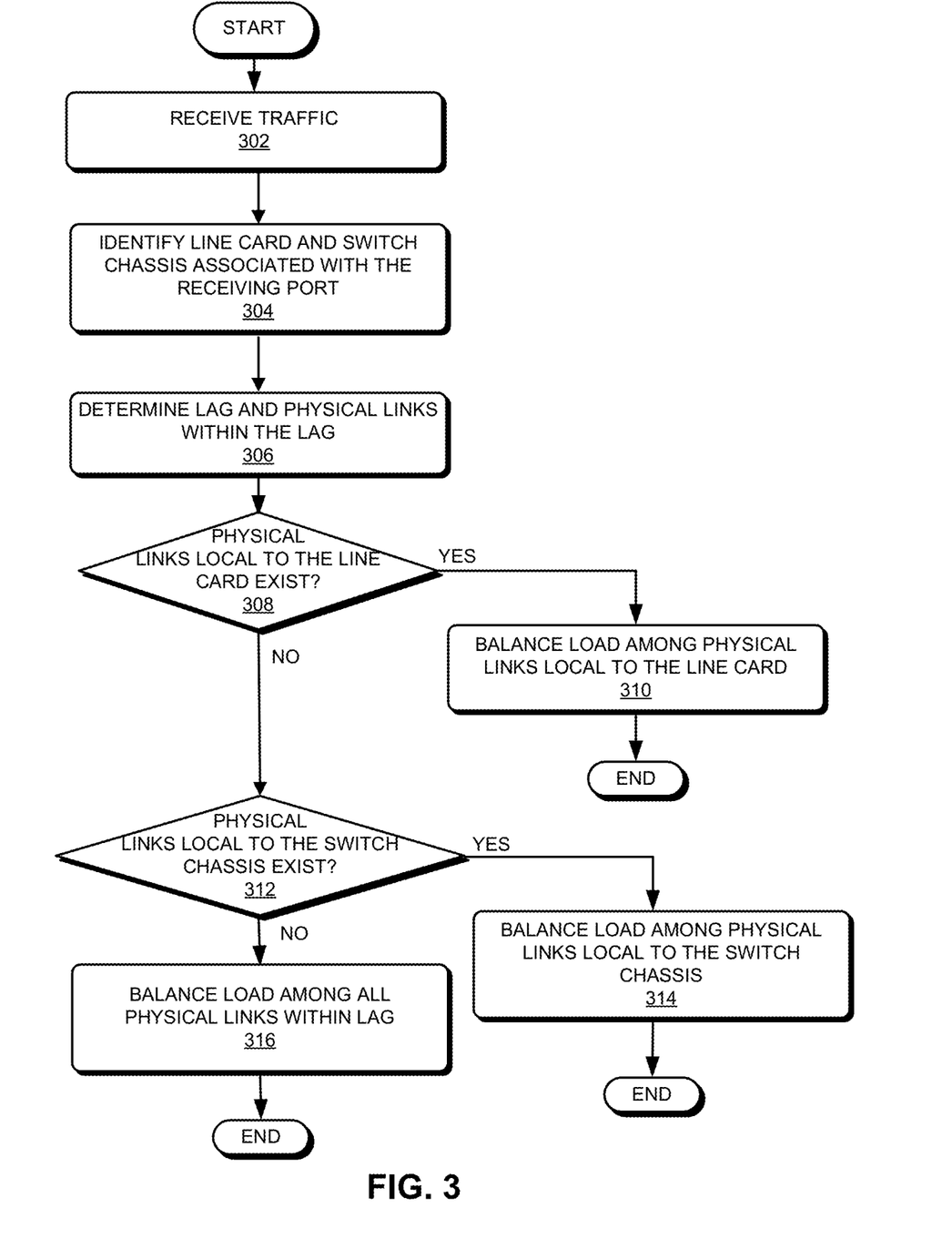
FIG. 3 presents a flowchart illustrating an exemplary load-balancing process, according to one embodiment.

FIG. 3 presents a flowchart illustrating an exemplary load-balancing process, according to one embodiment. During operation, the switch fabric receives traffic (operation 302). The switch fabric can include a plurality of physical devices (e.g., switches) that are interconnected. A stacking technology (e.g., front-plane stacking) can be implemented such that the switch fabric appears and behaves as a single logical switch. In some embodiments, the switch fabric can be accessible by the network through a single address (e.g., a single IP address). The traffic can include a plurality of data packets.

Upon receiving the traffic, the switch fabric can identify the line card and the switch chassis associated with the switch port receiving the traffic (operation 304). More specifically, the switch port receiving the traffic can report, to a switch controller, the identifiers of the line card and the switch chassis on which the switch port resides. In some embodiments, a switch controller may reside on each line card, thus being aware of the traffic status on the line card.

The switch fabric determines a LAG that can be used to forward the received traffic and identifies physical links included in the LAG (operation 306). In some embodiments, the switch fabric makes such a determination based on header information (e.g., destination address) included in the received data packets. Each identified physical link in the LAG is coupled to the switch fabric via a switch port. Note that, when the LAG was created, information associated with the group is distributed to all members of the group. In other words, each physical link within the LAG is aware of the existence of other physical links and their port numbers.

The switch fabric then determines, based on the identifiers of the line card and the switch chassis of the receiving port, whether one or more physical links within the LAG are local with respect to the line card (operation 308). For example, if the receiving port resides on the mth line card within the nth switch chassis, the switch fabric determines whether any of the physical links within the LAG is also coupled to the mth line card within the nth switch chassis. If so, the switch fabric balances the load among the physical links that are local with respect to the line card (operation 310). In some embodiments, the load-balancing operation performed by the switch fabric can involve calculating a hash based on header information included in the received data packets and/or status of the physical links. For example, congested physical links may be removed from the load-balancing table or may be given a lower priority. Different load-balancing techniques or criteria can be implemented. The scope of this disclosure is not limited by the actual implementation of the load-balancing technique. The result of the load-balancing operation maps to a physical link (e.g., the switch port to which the physical link is coupled). Consequently, the switch fabric forwards the received traffic using the mapped physical link.

In some embodiments, the load-balancing operation also considers the bandwidth of the physical links. If there are multiple physical links that are local with respect to the line card and these multiple physical links have different bandwidths, the load-balancing operation gives preference to physical links with a larger bandwidth. For example, if the determined local physical links include both 1 Gbps links and 10 Gbps links, the load-balancing operation further selects the 10 Gbps links to balance load.

If there is no physical link within the LAG that is local with respect to the line card receiving the traffic, the switch fabric determines, based on the identifier of the switch chassis of the receiving port, whether one or more physical links within the LAG are local with respect to the switch chassis (operation 312). For example, if the receiving port resides on the nth switch chassis, the switch fabric determines whether any of the physical links within the LAG is also coupled to the nth switch chassis. If so, the switch fabric balances the load among the physical links that are local with respect to the switch chassis (operation 314).

If there is no physical link within the LAG that is local with respect to the switch chassis receiving the traffic, the switch fabric can determine that all physical links within the LAG are remote and balance the load among all these remote physical links (operation 316). Note that, because there is no preference among all physical links with the LAG, a normal load-balancing operation can be performed. Similarly, the load-balancing operation can take into account the speed or bandwidth of the physical links.

In some embodiments, when a LAG is created or configured, the system can configure the load-balancing table in such a way that local physical links (either with respect to the line card or with respect to the switch chassis) are given preference. More specifically, when a LAG is created, for each line card within each switch chassis, the system determines whether there are physical links within the created LAG that can be considered local links (either with respect to the line card or with respect to the chassis). Such local physical links can then be added to the load-balancing table stored on that line card. This way, when the line card receives traffic to be forwarded over a LAG, the controller on the line card can access the load-balancing table that includes the local physical links and balance the load using the load-balancing table before forwarding the traffic. Similarly, when a new physical link joins a LAG, for each line card within each switch chassis, the system determines whether the newly joined physical link is closer (or more local) to that line card than physical links included in the existing load-balancing table. If so, the newly joined physical link is added to the load-balancing table, whereas existing entries in the load-balancing table that are further away may be removed. For example, if a newly joined physical link in a LAG is local with respect to the line card, existing physical links that are local with respect to the switch chassis not the line card may be removed from the load-balancing table on that line card.

Figure 4:
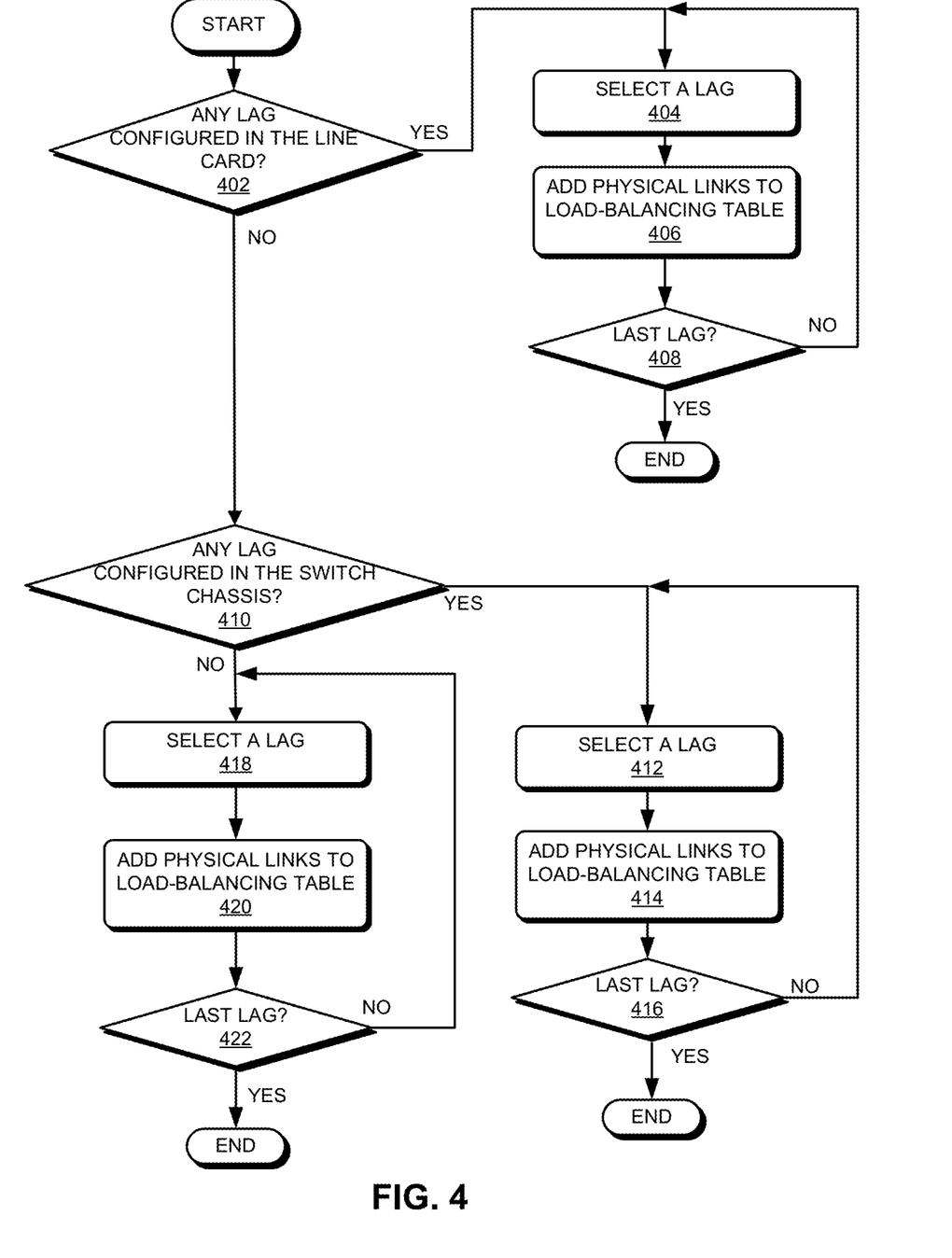
FIG. 4 presents a flowchart illustrating an exemplary process for creating a load-balancing table on a line card, according to one embodiment.

FIG. 4 presents a flowchart illustrating an exemplary process for creating a load-balancing table on a line card, according to one embodiment. During operation, a switch controller residing on the line card determines whether there are LAGs configured in the line card (operation 402). This means that the switch controller determines whether a LAG coupled to the switch fabric is also coupled to the line card. Note that when a LAG is configured, the switch ports for physical links within the LAG need to be configured for that LAG. If so, the switch controller selects a LAG (operation 404) and adds one or more physical links within the selected LAG that are coupled to the line card to a load-balancing table specific to the selected LAG (operation 406). The switch controller determines whether the selected LAG is the last LAG configured in the line card (operation 408) before selecting a next LAG (operation 404). Note that each LAG has its own load-balancing table.

If there is no LAG configured in the line card, the switch controller then determines whether there are LAGs configured in the same switch chassis where the line card resides (operation 410). If so, the switch controller selects a LAG (operation 412) and adds one or more physical links within the selected LAG that are coupled to the same chassis to the load-balancing table specific to the selected LAG (operation 414). The switch controller determines whether the selected LAG is the last LAG configured in the same switch chassis (operation 416) before selecting a next LAG (operation 412).

If there is no LAG configured in the same switch chassis, the switch controller can select a LAG (operation 418) and adds all physical links within the selected LAG to the load-balancing table specific to the selected LAG (operation 420). In some embodiments, the switch controller may also consider the speed of the physical links within the selected LAG and only add higher speed physical links (e.g., 10 G physical links) to the load-balancing table.

The switch controller determines whether the selected LAG is the last LAG configured in the switch fabric (operation 422) before selecting a next LAG (operation 418).

The same process can be performed for each line card within the switch fabric. Therefore, when traffic arrives at the switch fabric, each line card within the switch fabric is equipped with a load-balancing table that balances the load over local physical links whenever local physical links are available. Remote physical links are added to the load-balancing table only when no local physical link is available. The load-balancing table can be stored in the ASIC of the line card. The controller of the ASIC can include a processor that can be used to perform the operations shown in FIG. 4.

In practice, the LAGs can be configured dynamically, meaning that physical links can be added or removed from existing LAGs. Consequently, a load-balancing table needs to be updated dynamically when a physical link is added or removed from a LAG corresponding to the table. More specifically, when a physical link is removed from a LAG, the switch controller of a line card needs to determine whether removing the physical link will result in an empty load-balancing table for that LAG. If so, the switch controller needs to add other physical links to the load-balancing table. For example, if the removed physical link is the only physical link within the LAG that is local with respect to the line card, removing the physical link from the LAG can result in the load-balancing table for the LAG being empty. As a result, the switch controller needs to find other physical links within the LAG that may be configured in the same switch chassis and add these other physical links to the load-balancing table for that LAG. If no physical link is local with respect to the switch chassis, the switch controller can add all remaining physical links within the LAG to the load-balancing table. Because the load-balancing table is stored in the ASIC, modifying the load-balancing table is performed by the ASIC controller.

Figure 5:
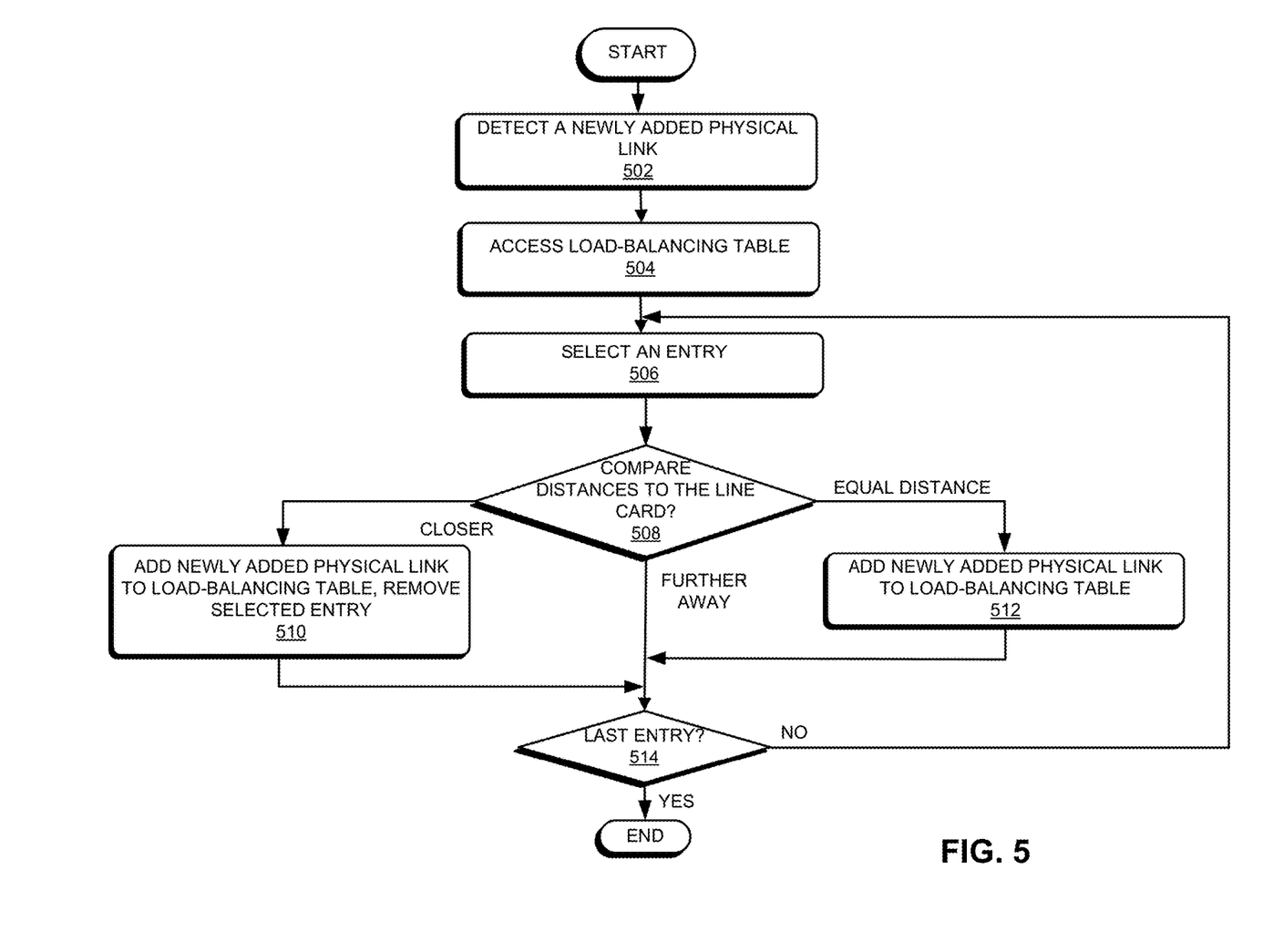
FIG. 5 presents a flowchart illustrating an exemplary process for updating a load-balancing table, according to one embodiment.
Figure 6:
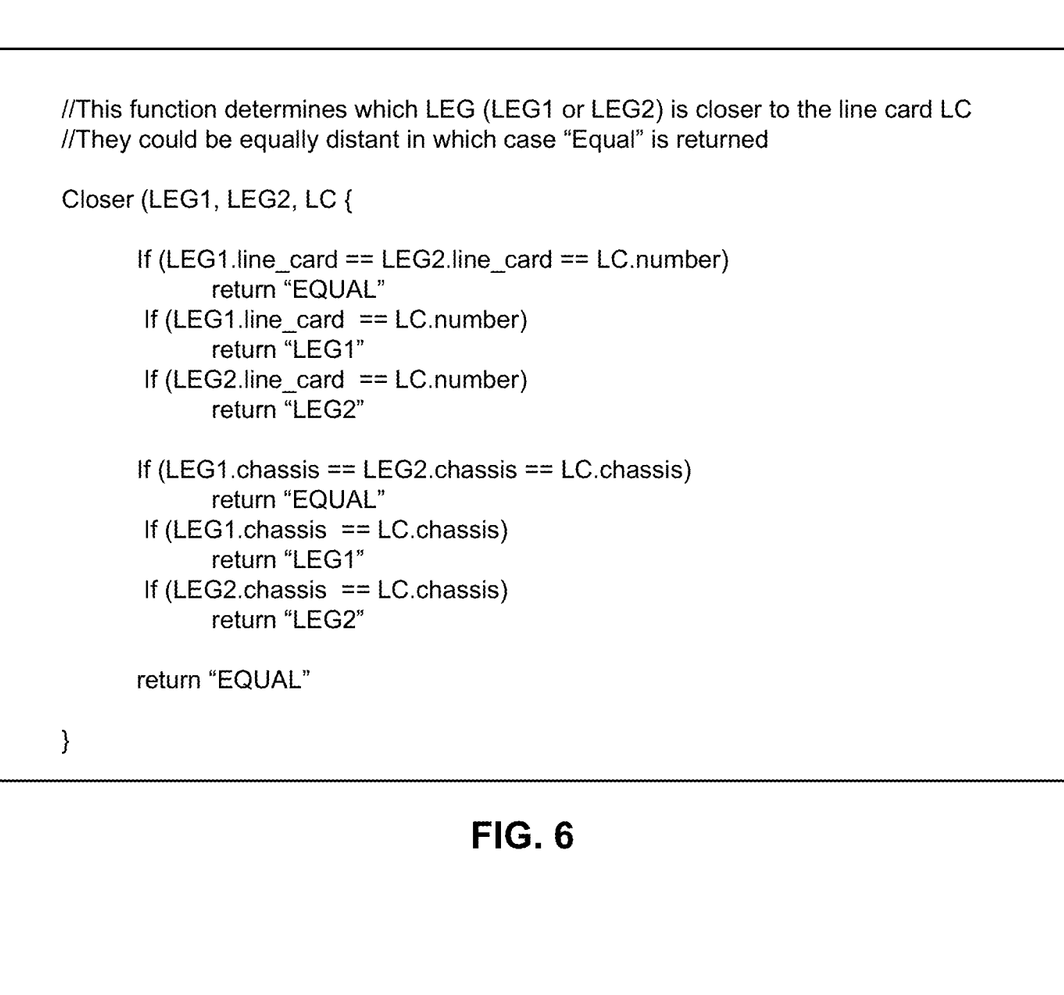
FIG. 6 presents the pseudocode for determining which physical link (or leg) within a pair of physical links is closer to a line card, according to one embodiment.

The situation can be more complicated when a new physical link is added to an existing LAG. FIG. 5 presents a flowchart illustrating an exemplary process for updating a load-balancing table, according to one embodiment. During operation, the switch controller residing on the line card detects that a physical link has been added to a LAG (operation 502). The switch controller accesses the load-balancing table for the LAG (operation 504) and selects an entry (operation 506). The switch controller then compares distances to the line card from the newly added physical link and from the selected entry (operation 508). More specifically, the switch controller determines whether the newly added physical link is closer to, an equal distance to, or further away from the line card compared with a physical link corresponding to the selected entry. Determining whether one physical link is closer, an equal distance to, or further away from the line card than another physical link can involve comparing the line card ID and the switch chassis ID of the switch ports to which the physical links are coupled with the line card ID and the chassis ID of the line card. FIG. 6 presents the pseudocode for determining which physical link (or leg) within a pair of physical links is closer to a line card, according to one embodiment. In the drawing, LEG1.line_card refers to the identifier of the line card to which LEG1 is coupled, and LEG1.chassis refers to the identifier of the switch chassis to which LEG1 is coupled. LC.number refers to the line card identifier of line card LC, and LC.chassis refers to the identifier of the switch chassis where line card LC resides.

If the newly added physical link is closer to the line card compared with the physical link corresponding to the selected entry, the switch controller adds the newly added physical link to the load-balancing table and removes the selected entry (operation 510). If the newly added physical link is an equal distance to the line card compared with the physical link corresponding to the selected entry, the switch controller adds the newly added physical link to the load-balancing table (operation 512). If the newly added physical link is further away from the line card compared with the physical link corresponding to the selected entry, the switch controller takes no action. The switch controller then determines whether the entry is the last entry in the load-balancing table (operation 514). If not, the switch controller selects the next entry (operation 506). If so, the process ends.

The Switch Controller

Figure 7:
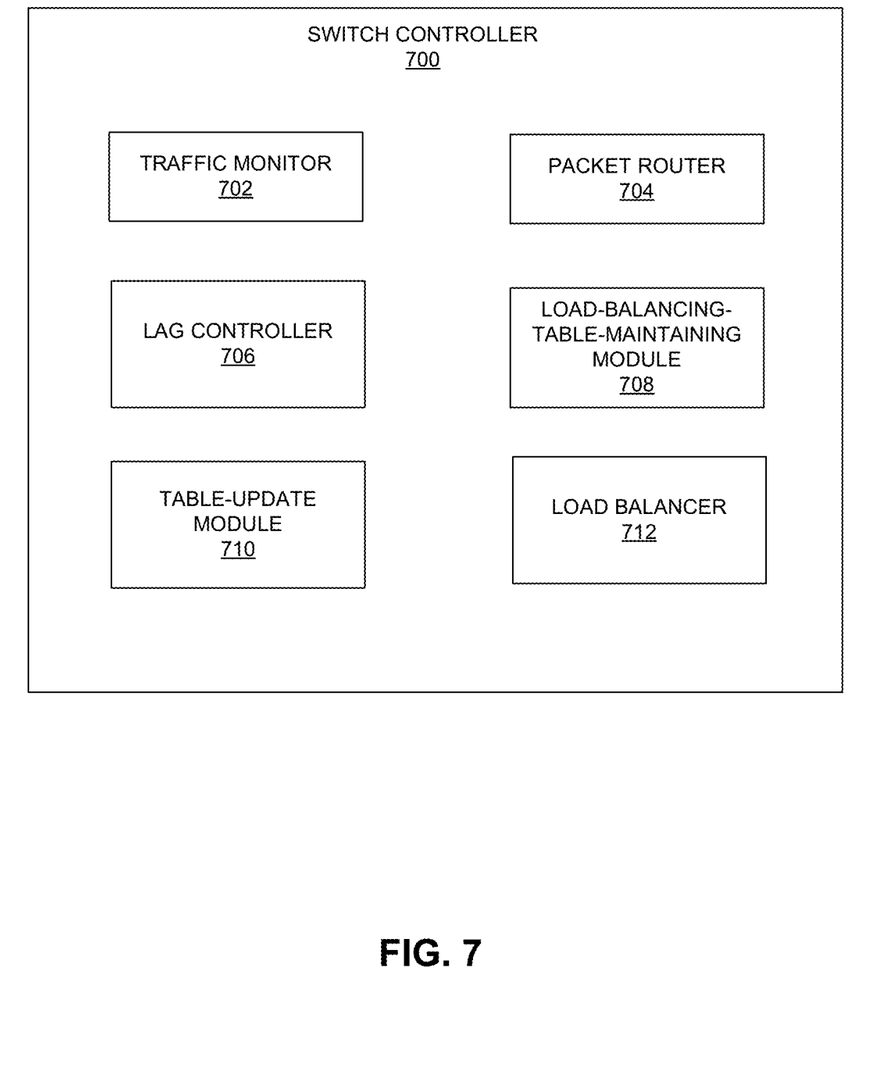
FIG. 7 illustrates the exemplary architecture of a switch controller, according to one embodiment.

FIG. 7 illustrates the exemplary architecture of a switch controller, according to one embodiment. Switch controller 700 can include a traffic monitor 702, a packet router 704, a LAG controller 706, a load-balancing-table-maintaining module 708, a table-update module 710, and a load balancer 712.

Switch controller 700 resides on a line card. The line card can reside on a switch chassis that includes multiple line cards, and the switch chassis can be part of a switch fabric that enables the VSF technology. More specifically, the switch fabric can include multiple inter-connected switch chassis, with the multiple switch chassis operating in a stacking mode. Traffic monitor 702 can be responsible for monitoring traffic arrived at the line card. Packet router 704 can be responsible for routing received packets. More specifically, packet router 704 can be responsible for determining, based on information included in the packet header, a LAG that can be used to forward a received packet.

LAG controller 706 can be responsible for controlling, including monitoring and configuring, LAGs coupled to the switch fabric. More specifically, LAG controller 706 can create a LAG, monitor status of physical links within the LAG, add or remove a physical link from an existing LAG, etc. In some embodiments, LAG controller 706 keeps track of all active physical links in each LAG.

Load-balancing-table-maintaining module 708 maintains a plurality of load-balancing tables, one for each LAG. In some embodiments, a load-balancing table for a LAG only includes physical links that are considered closest to the line card. For example, if the LAG includes physical links that are coupled to the same line card, the load-balancing table for this particular LAG only includes these physical links that are coupled to the same line card. If no physical link coupled to the same line card is available, the load-balancing table for this particular LAG includes physical links that are coupled to the same switch chassis. On the other hand, if no physical link coupled to the same switch chassis is available, the load-balancing table for this LAG may include all physical links within the LAG. In further embodiments, load-balancing-table-maintaining module 708 may also consider the speed or bandwidth of each physical link and may include physical links that are closest to the line card and are fastest.

Table-update module 710 can be responsible for updating the load-balancing table in the event of physical links joining or leaving the LAG. In some embodiments, table-update module 710 updates the load-balancing table specific to a LAG on a line card when a physical link is added to the LAG. More specifically, table-update module 710 updates the load-balancing table based on the distance between the newly added physical link and the line card.

Load balancer 712 can be responsible for performing the load-balancing operation based on the load-balancing table. In some embodiments, load balancer 712 may compute a hash function based on information included in the headers of the received packets and select a physical link in the load-balancing table to forward the received packets.

Figure 8:
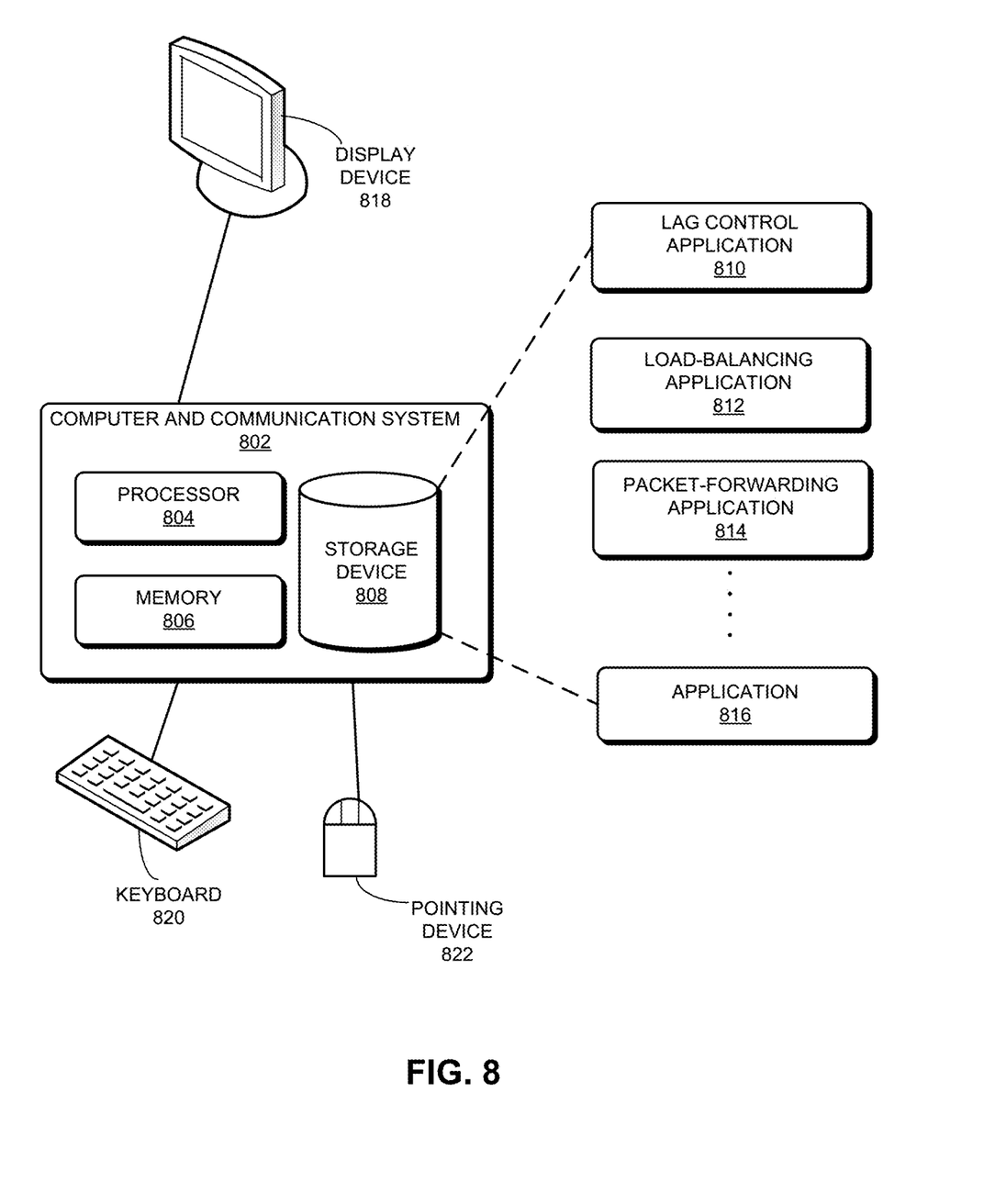
FIG. 8 illustrates an exemplary computer and communication system that facilitates load balancing over a LAG, in accordance with an embodiment of the present invention.

FIG. 8 illustrates an exemplary computer and communication system that facilitates load balancing over a LAG, in accordance with an embodiment of the present invention. A computer and communication system 802 includes a processor 804, a memory 806, and a storage device 808. Storage device 808 stores various applications that can be used to facilitate the load-balancing and packet-forwarding operatories, such as a LAG control application 810, a load-balancing application 812, a packet-forwarding application 814, as well as other applications, such as application 816. During operation, LAG control application 810, load-balancing application 812, and packet-forwarding application 814 can be loaded from storage device 808 into memory 806 and then executed by processor 804. While executing the program, processor 804 performs the aforementioned functions. Computer and communication system 802 is coupled to an optional display device 818, keyboard 820, and pointing device 822.

In general, embodiments of the present invention provide a system and method for traffic forwarding over a LAG in a VSF environment. Because VSF technology allows switches from different chassis to operate in a stacking mode to act as a single logical switch, LAGs can be formed using switch ports from different switch chassis. In other words, physical links of the same LAG may be coupled to different switch chassis. To reduce overall latency and to prevent possible congestion on the inter-chassis links (e.g., FPS links), when performing load balancing over a LAG, the system takes into consideration the physical locations of the physical links within the LAG. More specifically, the system identifies physical links that are considered local (either with respect to the line card receiving the traffic or with respect to the switch chassis receiving the traffic) and gives preference to the identified local links when performing load balancing. For example, the system may identify physical links that are closest to the line card receiving the traffic, and balances load over these closest physical links. The system implements this novel load-balancing technique by modifying the load-balancing tables. More specifically, when load-balancing tables on a line card are generated, the system considers the distance between a physical link and the line card. Furthermore, when the load-balancing tables are updated due to a LAG update, the system also considers the distance between a newly added physical link and the line card. In addition to physical distance to the line card, the system may further consider the speed of the physical links when making a load-balancing decision.

In addition to LAG load balancing in the VSF environment, the system and method disclosed herein can also be applied to other scenarios, where traffic needs to be balanced among multiple paths, with the multiple paths being coupled to equipment at different physical locations. One such example is an equal-cost multi-path (ECMP)-enabled network. In an ECMP-enabled network, packets to a single destination can occur over multiple "best paths." Load balancing among these ECMP paths is needed. Conventional ECMP load-balancing schemes distribute packets among multiple physical links (paths) based on Layer 3 (L3) routing information, regardless of the physical location of the switch ports used to forward the packets. Such approaches may result in packet delay and unwanted congestions in the switch fabric. However, using the same principle described herein, a novel ECMP load-balancing scheme can take into consideration the physical location of the switch ports to which the best paths are originated, and selects a local switch port, either with respect to the line card or with respect to the switch chassis receiving the traffic, to forward the traffic.

Throughout this disclosure, switch chassis having multiple line cards have been used as an example for implementing the traffic forwarding mechanism that prefers local ports. In practice, other types of switches, such as stackable switches, can also be used. For example, switches that have a pizza box form factor and are interconnected via FPS links can also implement the load-balancing scheme that prefers local ports over remote ports. The scope of this disclosure is not limited by the form factor of the switches.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for creating a load-balancing table on a line card, the method comprising:
   identifying, by a controller of the line card, a plurality of physical links for forwarding traffic arrived at the line card;
   in response to determining that one or more physical links within the identified plurality of physical links are coupled to the line card, adding the one or more physical links coupled to the line card to the load-balancing table;
   in response to determining that no physical link within the identified plurality of physical links is coupled to the line card and that one or more physical links within the identified plurality of physical links are coupled to a same switch chassis where the line card resides, adding the one or more physical links coupled to the same switch chassis to the load-balancing table and
   in response to detecting that a new physical link is added to the identified plurality of physical links, updating the load-balancing table based on a distance between the new physical link and the line card, wherein updating the load-balancing table comprises:
   for each physical link in the load-balancing table,
      if a distance between the physical link and the line card is greater
      than a distance between the new physical link and the line card, removing the physical link from the load-balancing table and adding
the new physical link to the load-balancing table;
if a distance between the physical link and the line card
equals a distance between the new physical link and
the line card, adding the new
physical link to the load-balancing table; and
if a distance between the physical link and the line card
is less
than a distance between the new physical link and the line
card, leaving
the load-balancing table unchanged.

2. The computer-implemented method of claim 1, the method comprising:
in response to determining that no physical links within the identified plurality of physical links is coupled to the same switch chassis where the line card resides, adding all physical links within the identified plurality of physical links to the load-balancing table.

3. The computer-implemented method of claim 1, wherein adding the one or more physical links coupled to the line card or the same switch chassis to the load-balancing table further comprises:
comparing bandwidths associated with the one or more physical links; and
adding physical links with a higher bandwidth to the load-balancing table.

4. The computer-implemented method of claim 1, wherein the identified plurality of physical links are coupled to different switch chassis.

5. The computer-implemented method of claim 1, wherein the load-balancing table is stored in an application-specific integrated circuit (ASIC) residing on the line card.

6. The computer-implemented method of claim 1, wherein the different switch chassis implement a front-plane stacking technology to form a single logical switch.

7. A switch controller, comprising:
a processor; and
a storage device coupled to the processor and storing instructions which when executed by the processor cause the processor to perform a method, the method comprising:
identifying a plurality of physical links for forwarding traffic arrived at the line card;
in response to determining that one or more physical links within the identified plurality of physical links are coupled to the line card, adding the one or more physical links coupled to the line card to the load-balancing table;
in response to determining that no physical link within the identified plurality of physical links is coupled to the line card and that one or more physical links within the identified plurality of physical links are coupled to a same switch chassis where the line card resides, adding the one or more physical links coupled to the same switch chassis to the load-balancing table and
in response to detecting that a new physical link is added to the identified plurality of physical links, updating the load-balancing table based on a distance between the new physical link and the line card, wherein updating the load-balancing table comprises:
for each physical link in the load-balancing table,
if a distance between the physical link and the line card is greater
than a distance between the new physical link and the line card, removing
the physical link from the load-balancing table and adding the new physical link to the load-balancing table;
if a distance between the physical link and the line card equals a distance between the new physical link and the line card, adding the new
physical link to the load-balancing table; and
if a distance between the physical link and the line card is less
than a distance between the new physical link and the line card, leaving
the load-balancing table unchanged.

8. The switch controller of claim 7, wherein the method comprises:
in response to determining that no physical links within the identified plurality of physical links is coupled to the same switch chassis where the line card resides, adding all physical links within the identified plurality of physical links to the load-balancing table.

9. The switch controller of claim 7, wherein adding the one or more physical links coupled to the line card or the same switch chassis to the load-balancing table further comprises:
comparing bandwidths associated with the one or more physical links; and
adding physical links with a higher bandwidth to the load-balancing table.

10. The switch controller of claim 7, wherein the method comprises: wherein the identified plurality of physical links are coupled to different switch chassis.

11. The switch controller of claim 7, wherein the load-balancing table is stored in an application-specific integrated circuit (ASIC) residing on the line card.

12. The switch controller of claim 7, wherein the different switch chassis implement a front-plane stacking technology to form a single logical switch.

13. A system, comprising:
a processor; and
a storage device coupled to the processor and storing instructions which when executed by the processor cause the processor to:
identify a plurality of physical links for forwarding traffic arrived at the line card;
in response to determining that one or more physical links within the identified plurality of physical links are coupled to the line card, ad the one or more physical links coupled to the line card to the load-balancing table;
in response to determining that no physical link within the identified plurality of physical links is coupled to the line card and that one or more physical links within the identified plurality of physical links are coupled to a same switch chassis where the line card resides, add the one or more physical links coupled to the same switch chassis to the load-balancing table and
in response to detecting that a new physical link is added to the identified plurality of physical links, update the load-balancing table based on a distance between the new physical link and the line card, wherein updating the load-balancing table comprises:
for each physical link in the load-balancing table,
if a distance between the physical link and the line card is greater
than a distance between the new physical link and the line card, removing
the physical link from the load-balancing table and adding the new physical link to the load-balancing table;
if a distance between the physical link and the line card equals a distance between the new physical link and the line card, adding the new physical link to the load-balancing table; and
if a distance between the physical link and the line card is less than a distance between the new physical link and the line card, leaving the load-balancing table unchanged.

14. The system of claim 13, further storing instructions which when executed by the processor cause the processor to:
in response to determining that no physical links within the identified plurality of physical links is coupled to the same switch chassis where the line card resides, adding all physical links within the identified plurality of physical links to the load-balancing table.

15. The system of claim 13, wherein adding the one or more physical links coupled to the line card or the same switch chassis to the load-balancing table further comprises:
comparing bandwidths associated with the one or more physical links; and
adding physical links with a higher bandwidth to the load-balancing table.

16. The system of claim 13, wherein the method comprises: wherein the identified plurality of physical links are coupled to different switch chassis.

17. The system of claim 13, wherein the load-balancing table is stored in an application-specific integrated circuit (ASIC) residing on the line card.

18. The system of claim 13, wherein the different switch chassis implement a front-plane stacking technology to form a single logical switch.

* * * * *